United States Patent [19]

Pohjola et al.

[11] 4,038,223

[45] July 26, 1977

[54] NOVEL SEGMENTED COPOLYMERS CONTAINING FREE HYDROXYL GROUPS AND METHOD OF PREPARING THE SAME

[75] Inventors: Leila Pohjola, Veikkola; Olavi Harva; Jaakko Karvinen, both of Helsinki, all of Finland

[73] Assignee: Neste Oy, Finland

[21] Appl. No.: 618,038

[22] Filed: Sept. 30, 1975

[51] Int. Cl.$^2$ .............................................. C08L 5/00
[52] U.S. Cl. ...................................................... 260/9
[58] Field of Search .................. 260/2.5 AS, 9, 75 NP

[56] References Cited

U.S. PATENT DOCUMENTS

| | | | |
|---|---|---|---|
| 2,933,463 | 4/1960 | Novak ....................................... | 260/9 |
| 3,502,601 | 3/1970 | Case et al. ........................ | 260/75 TN |

*Primary Examiner*—V. P. Hoke

*Attorney, Agent, or Firm*—Steinberg & Blake

[57] ABSTRACT

Novel segmented copolymers containing free hydroxyl groups and comprising hard and soft segments, the hard segments comprising polyhydroxy compounds containing two primary hydroxyl groups and at least two secondary hydroxyl groups, and the soft segments comprising low molecular weight polyesters or polyethers having terminal isocyanate groups the hard and soft segments being linked to each other at the primary hydroxyl groups and the isocyanate groups, the copolymer being substantially free of cross linking and containing free hydroxyl groups. The segmented copolymers are produced by reacting the low molecular weight polyether or polyester containing terminal isocyanate groups with the polyhydroxy compound, for example a disaccharide or sugar alcohol, in an N-ethylpyridinium chloride melt.

13 Claims, No Drawings

NOVEL SEGMENTED COPOLYMERS CONTAINING FREE HYDROXYL GROUPS AND METHOD OF PREPARING THE SAME

BACKGROUND OF THE INVENTION

Elastomeric segment polymers are understood to be polymers which are composed of units constituted by "soft segments" and "hard segments" or "rigid segments". Polymers of this kind possess very interesting properties one of the most important of which is a high extensibility and reversibility after dilation. As an example of this type of segmented polymer there may be mentioned the so-called Spandex fibers in which "hard" segments consisting of urethane or urethane-urea are joined to "soft" polyester or polyether segments.

Various methods are known for making elastomeric polymers of the above type. Diisocyantes are generally used as coupling agents for diols and other difunctional polymers. Thus, for example, in U.S. Pat. No. 3,386,932 a low molecular weight polyester or polyether is joined by means of a diisocyanate to a segment obtained by depolymerizing cellulose triacetate, the segment having hydroxyl end groups and a molecular weight on the order of 3000 to 4000. This method results in the production of a segment polymer which is suitable for casting into clear, elastic and rigid films as provided for in U.S. Pat. No. 3,386,930.

The segmented polymer produced according to U.S. Pat. No. 3,386,932 starting with cellulose triacetate segments which are subsequently deacetylated whereby a product containing free hydroxyl groups is obtained has been considered to be suitable for use as a biodegradable polymer (Journal of Polymer Sciences, Polymer Letters Edition, vol. 11 (1973), pages 731-735). The method provides for the use of segments obtained by depolymerizing cellulose triacetate and which have a molecular weight between 1000 and 5000 and in which the free hydroxyl groups are acetylated. The end product is then deacetylated to thereby regain free hydroxyl groups. The procedure is complicated and the uses to which the product can be put are limited.

SUMMARY OF THE INVENTION

Generally speaking in accordance with the present invention novel segmented copolymers containing free hydroxyl groups are provided, these segmented copolymers comprising hard and soft segments, the hard segments comprising polyhydroxy compounds containing two primary hydroxyl groups and at least two secondary hydroxyl groups and the soft segments comprising low molecular weight polyesters or polyethers having terminal isocyanate groups, the hard segments being linked substantially only at the primary hydroxyl groups thereof to the isocyanate groups of the soft segments so that the segmented copolymer is substantially free of cross linking and contains free hydroxyl groups. The present invention further provides for the method of producing these segmented copolymers which results in the linking of the hard segments to the isocyanate groups of the soft segments only at the primary hydroxyl groups of the hard segments so that the resulting copolymer is substantially free of cross linking and contains the free hydroxyl groups which were the secondary hydroxyl groups of the original polyhydroxy compounds.

It is accordingly a primary object of the present invention to provide novel segmented copolymers containing free hydroxyl groups which are useful for a variety of purposes.

It is another object of the present invention to provide the method of producing these novel segmented copolymers.

It is yet a further object of the present invention to provide novel segmented copolymers and methods of producing the same, which copolymers contain free hydroxyl groups so that the same can be colored easily, and provide fibers and films with a degree of hydrophilic characteristics.

It is yet a further object of the present invention to provide novel segmented copolymers and methods of producing the same which contain free hydroxyl groups which, if desired, can be cross linked to provide rubber-like properties thereto.

Other objects and advantages of the present invention will be apparent from a further reading of the specification and of the appended claims.

With the above and other objects in view, the present invention mainly comprises a segmented copolymer containing free hydroxyl groups and comprising hard and soft segments, the hard segments comprising polyhydroxy compounds containing two primary hydroxyl groups and at least two secondary hydroxyl groups, and the soft segments comprising low molecular weight polyesters or polyethers having terminal isocyanate groups, the hard segments being linked substantially only at the primary hydroxyl groups to the isocyanate groups of the soft segments so that the segmented copolymer is substantially free of cross linking and contains free hydroxyl groups as a result of no linkage at the secondary hydroxyl groups.

The method of producing the above segmented copolymers containing free hydroxyl groups mainly comprises reacting a low molecular weight polyester or polyether having terminal isocyanate groups with a solution of a polyhydroxy compound containing two primary hydroxyl groups and at least two secondary hydroxyl groups in an N-ethylpyridinium chloride melt, whereby linkage occurs substantially only at the primary hydroxyl groups of the polyhydroxy compound and the isocyanate groups of the polyester or polyether so that the resulting segment copolymer contains free hydroxyl groups.

One of the starting materials used in the method of the present invention are polyhydroxy compounds containing two primary hydroxyl groups and several secondary hydroxyl groups. The most suitable of such polyhydroxy compounds are disaccharides or sugar alcohols, which may be obtained by hydrolyzing disaccharides. All of the disaccharides are suitable for the purposes of the present invention, the most suitable of which, however, are cellobiose, lactose and maltose.

All sugar alcohols which may be represented by the general formula:

$$HOCH_2(CHOH)_nCH_2OH$$

wherein $n$ may vary generally between 2 and 5, are suitable as polyhydroxy compounds for the purposes of the present invention. Among the most suitable of such sugar alcohols are erythritol, treitol, ribitol, xylitol, arabitol, allitol, dulcitol, sorbitol, glucitol, mannitol, thalitol, isitol, heptitol and octitol. Xylitol, sorbitol and mannitol are among the most common sugar alcohols and are therefore preferred because of easy availability.

The other starting material for the present invention are low molecular weight polyesters having terminal isocyanate groups or low molecular weight polyethers having terminal isocyanate groups.

Means of adding terminal isocyanate groups to polyesters or polyethers are per se well known. This is generally accomplished by reacting the polyester or polyether with an organic diisocyanate. The reaction is carried out in such manner, including adjustment of mol portions, that no cross linking occurs during the reaction but only terminal isocyanate groups are added onto the polyester or polyether.

Since the isocyanate groups react with polyhydroxy compounds preferably through the primary hydroxyl groups and the method of the present invention makes it possible to link the polyhydroxy compounds containing the two primary hydroxyl groups and also containing the secondary hydroxyl groups with the isocyanate bond to the low molecular weight polyester or polyether in such manner that the secondary hydroxyl groups remain free, the cross linking is minimal and new segmented polymers having interesting properties are obtained.

Thus, the new polymers of the present invention possess elastomeric properties as a result of the alternation of rigid segments and soft polyester or polyether segments. Furthermore, the free hydroxyl groups in the product give the product the properties of good stainability with many coloring agents including those used in staining cellulose and those used for polyesters. Furthermore, the free hydroxyl groups lend a degree of hydrophilic characteristics to the fibers and films prepared from the polymer, which is a desirable characteristic for various textile-type products. Still further, the free hydroxyl groups offer the possibility, if desired, to cross link the segment copolymer, whereby rubber-like properties are obtained.

The low molecular weight polyesters and polyethers to which the terminal isocyanate groups are attached according to the present invention have an average molecular weight of from about 250 to about 5000.

These low molecular weight polyesters and polyethers are obtained from any of the common polyhydroxy compounds used in the production thereof, including ethylene glycol, diethylene glycol, triethylene glycol, pentaethylene glycol, hexamethyleene glycol, decamethylene glycol, dodecamethylene glycol, propylene glycol, 1,2-propylene glycol, 1,3-propylene glycol, butanediol-1,2, butanediol-2,3, butanediol-1,3,butanediol-1,4, isobutylene glycol, pinacol, hexanediol-1,4,pentanediol-1,5, 2-methyl-2,4-pentanediol, heptanediol-1,4,thiodiglycol, n-butyldiethanolamine, N-N-diethanolaniline, hydroquinone diglycolether, trans-hexahydroxylene glycol, m-dihydroxybenzene, o-dihydroxybenzene, etc.

Any of the dicarboxylic acids commonly used to form polyesters with the dihydroxy compounds can be used to form the low molecular weight polyesters which are utilized in accordance with the present invention, including adipic acid, betamethyladipic acid, azelaic acid, fumaric acid, glutaric acid, 2-phenylglutaric acid, maleic acid, malonic acid, sebacic acid, suberic acid, succinic acid, pimelic acid, 4-ketopimelic acid, itaconic acid, phthalic acid, isophthalic acid, terephthalic acid, hexahydroterephthalic acid, cyclopentane-1,2-dicarboxylic acid, cyclopentane-1,3-dicarboxylic acid, cyclohexane-1,2-dicarboxylic acid, cyclohexane-1,3-dicarboxylic acid, cyclohexane-1,4-dicarboxylic acid, naphthalene-1,2-dicarboxylic acid, napthalene-1,3-dicarboxylic acid, naphthalene-1,4-dicarboxylic acid, naphthalene-1,5-dicarboxylic acid, diphenylene-2,2-dicarboxylic acid, diphenylene-1,4'-dicarboxylic acid, diphenylene-2,4'-dicarboxylic acid, xylylene-1,4-dicarboxylic acid, xylylene-1,3-dicarboxylic acid, xylylene-1,2-dicarboxylic acid, camphoric acid, etc.

Among the most suitable of the low molecular weight polyesters for the purposes of the present invention are poly (ethyleneglycol), poly (tetramethylene oxide), polyethylene ether glycol and the reaction products of, for example ethylene glycol with adipic acid, propane diol with sebacic acid, ethylene glycol and propylene glycol with adipic acid, adipic acid and phthalic acid with hexane triol, etc.

Any of the organic diisocyantes which are commonly used as coupling agents may be used for the purpose of adding terminal isocyanate groups to the low molecular weight polyesters and polyethers. The most suitable of these organic diisocyanates are, for example hexamethylene diisocyanate, toluene diisocyanate and 4,4-diphenylmethane diisocyanate.

The reaction between the polyester or polyether and the organic diisocyanate for the addition of the terminal isocyanate groups to the polyester or polyether is carried out in per se known manner. The mol ratio of polyester (or polyether) and diisocyanate may vary from about 1 : 1.1 to about 1 : 2, the most suitable mol ratio being 1 : 2. This reaction for the addition of the terminal isocyanate groups to the polyester or polyether may be effected in any solvent commonly used for this purpose, for example in a halogenated hydrocarbon. In some cases the reaction may be carried out without any solvent. The main consideration is that no cross linking should occur during the reaction, which would result in a gelated product being obtained. In accordance with a preferred embodiment of the present invention pyridine is used as the solvent for carrying out the reaction in which the terminal isocyanate groups are added to the polyester or polyether. The reasons for the use of pyridine for this purpose will be apparent below.

This reaction may be carried out, for example by dissolving the polyester or polyether and the organic diisocyanate in suitable mol proportions (e.g. 1: 2) in the solvent and permitting the reaction to take place at a temperature of, for example, between 25° and 120° C. The reaction time is generally on the order of about two hours.

When using pyridine as the solvent in accordance with the preferred embodiment of the present invention, the advantage is achieved that the pre-polymer need not be isolated from the reaction solution. Instead, the reaction solution containing the pre-polymer may instead be added directly to the solvent in which the formation of the segment polymer takes place, e.g. the N-ethylpyridinium chloride melt. Thus, if the solvent is other than pyridine, the pre-polymer must be separated from the solvent in per se known manner after which it is dissolved, possibly after first being washed, in pyridine or dimethylformamide. The solvent used in the reaction should be anhydrous in order to avoid any reaction between diisocyanate and water, and in general this reaction for the addition of the isocyanate terminal groups is effected in an atmosphere of a gas which is inert to the reactants, for example nitrogen.

The novel segmented copolymers of the present invention are produced by reacting the low molecular weight polyester or polyether having terminal isocyanate groups with the polyhydroxy compound, for example the disaccharide or sugar alcohol in an N-ethylpyridinium chloride melt. The dissolution of the polyhydroxy compound containing the two primary hydroxyl groups is an important aspect of the process of the present invention. Thus, it has been found according to the present invention that if this polyhydroxy compound, for example the disaccharide or sugar alcohol containing the two primary hydroxyl groups is dissolved in an N-ethylpyridinium chloride melt and the polyester or polyether having the terminal isocyanate groups is added thereto, the result of the reaction is a soluble segment polymer containing free hydroxyl groups. The fact that the segment polymer is soluble in typical polyurethane solvents such as pyridine, dimethylformamide, dimethylsulfoxide and sulfolan, among other solvents, confirms that no substantial cross linking took place during the reaction resulting in the formation of the segment polymer.

It is for this reason that the adduction reaction is carried out according to the present invention by adding the polyester or polyether having the terminal isocyanate groups to the solution of the polyhydroxy compound containing the two primary hydroxyl groups in the N-ethylpyridinium chloride melt.

In order to lower the reaction temperature the melting point of the melt may be suitably lowered for example by the addition to the melt of dimethylformamide, pyridinium, dimethylsulfoxide or sulfolan up to 50% of the quantity of the salt. The polyester or polyether having the terminal isocyanate groups is added to the melt which serves as the reaction medium preferably in pyridine solution, although the polyester or polyether may also be added as such without any intermediate solvent.

The amount of the polyhydroxide compound containing the two primary hydroxyl groups, for example the disaccharide or sugar alcohol which is added to the N-ethylpyridinium chloride melt serving as the reaction medium may vary within wide limits. Amounts of between about 1% and 25% have been found to be most suitable.

The amount of the low molecular weight polyester or polyether having terminal isocyanate groups which is added to the reaction medium of the polyhydroxy compound in the N-ethylpyridinium chloride melt is such that the mol proportions of the reactants are preferably: polyhydroxy compound : polyester (or polyether) : diisocyanate = 1 : 1 : 2.

The reaction temperature may be varied within wide limits and is most effectively maintained at between about 50°–120° C. The reaction time will also vary within wide limits of for example 1 to 50 hours.

In accordance with a further embodiment of the present invention a cross linking-preventing catalyst is added to the reaction medium in an amount which will be effective to prevent cross linking. Suitable catalysts of this type are triethylamine and 1,4-diazabicyclo-2,2,2-octane. The preferred amount of catalyst is up to about 0.5% by weight, most preferably about 0.35% by weight.

The elastomeric segment copolymers produced in accordance with the present invention can be utilized for the preparation of clear, elastic films by pouring from the solution. On the other hand, it is possible to prepare fibers from the segment copolymers by spinning from the solutions, the fibers thus produced having a hydrophilic feel due to the presence of the free hydroxyl groups. The segmented polymers both in the form of films and fibers can be easily stained and used for various purposes.

The novel segmented copolymers produced according to the present invention can have molecular weights within relatively wide limits. The average molecular weight of these novel segmented copolymers is generally between about 10000 and about 25000.

DESCRIPTION OF PREFERRED EMBODIMENTS

The following examples are given to further illustrate the present invention. The scope of the invention is not, however, meant to be limited to the specific details of the examples.

EXAMPLE 1

The pre-polymer is prepared from the polyester polydiethylene adipinate with hydroxyl terminal groups, having the molecular weight $M_n = 990$, and from diphenylmethane-4,4'-diisocyanate (MDI). 15.0 g of the polyester and 7.5 g MDI (mol proportion 1:2) are dissolved in 25 ml of dry pyridine and allowed to react for 2 hours at 80° C. The reaction vessel is a 100 ml round flask, enclosed in a heating jacket. Nitrogen gas is conducted into the flask and magnetic stirring is employed. Glycerol is circulated through the heating jacket from a Lauda thermostat.

The segment polymer is prepared in a Sovirel I 1 thermostat reaction vessel (SVL 295-OI) with mechanical agitation, nitrogen conduit, refluxing and drying tube. Glycerol is circulated through the heating jacket from a Lauda thermostat. 150 g N-ethylpyridinium chloride and 75 ml dimethylformamide are mixed in the reaction vessel at 80° C for 1 hour. 5.0 g cellobiose are added to the clear salt melt and instillation through a dropping funnel of the pyridine solution of the prepolymer, cooled to room temperature, is then begun. After two hours from the commencement of the reaction, 1.0 g of 1,4-diazabicyclo-2,2,2-octane dissolved in 5 ml pyridine are added to the mixture to serve as catalyst. The reaction is continued for another two hours, whereupon the product is precipitated with 4 liters of methanol, filtered, and dried under reduced pressure at 35° to 40° C. The product is purified by dissolving it in 100 ml dimethylformamide and precipitating from the solution with methanol. The fibrous polymer is filtered, washed with methanol and dried at reduced pressure at 35° to 40° C. The yield of purified segment polymer is 53%.

The limiting viscosity of the product is determined at 25° C with dimethylformamide as solvent. It is found to be $/n/ = 0.71$ dl g.

The dimethylformamide solution of the product is processed into film. The thickness of the film is 0.09 mm, its tensile strength 161 kg/cm$^2$ and the elongation, 1300%. The polymer solution could also be precipitated in the form of elastic fiber.

EXAMPLE 2

The pre-polymer is prepared by dissolving 28.0 g polydiethlene glycol adipinate, with molecular weight $M_n = 955$, and 14.6 g MDI (mol proportion 1:2) in 25 ml of pyridine and reacting the mixture at 80° C during 2 hours.

The segment polymer is prepared as follows: 150 g N-ethylpyridinium chloride and 75 ml dimethylsulfoxide are mixed in a Sovirel thermostated reaction vessel at 80° C for 1 hour, and 10.0 g cellobiose are added to the clear salt melt. The cooled pyridine solution of the pre-polymer is instilled through a dropping funnel into the cellobiose solution during 30 min. When two hours have passed from the commencement of reaction, 1.0 g of 1,4-diazabicyclo-2,2,2-octane dissolved in 5 ml of pyridine are added to the mixture to act as catalyst. The total reaction period is 4 hours. The product is precipitated and purified as described in Example 1. The yield is 64%.

The limiting viscosity /n/ of the product in dimethylformamide at 25° C is 1.33 dl g. The segment polymer is processed into film from dimethylformamide solution. The film has 0.06 mm thickness, tensile strength 273 kg/cm² and elongation 970%. The polymer solution could also be precipitated in the form of elastic fiber.

EXAMPLE 3

The pre-polymer is prepared by dissolving 18.0 g polydiethylene glycol adipinate, with molecular weight 570, and 15.0 g MDI (mol proportion 1:1.9) in 25 ml of pyridine and allowing the mixture to react at 80° C for 2 hours.

The segment polymer is prepared from the prepolymer and 10.0 g cellobiose in the same manner as in Example 1. The same solvent quantities as in Example 1 are also employed. However, the total reaction period is only three hours, the catalyst being added 2 hours after commencement of reaction. The yield of purified product is 58%.

The limiting viscosity /n/ of the segment polymer in dimethylformamide at 25° C is 0.61 dl g. The dimethylformamide solution of the product is processed into film. This had the thickness 0.05 mm, tensile strength 395 kg/cm² and elongation 600%. The polymer solution could also be precipitated in the form of elastomeric fiber.

EXAMPLE 4

The pre-polymer is prepared by dissolving 3.1 g diethylene glycol and 15.0 g MDI (mol proportion 1:2) in 25 ml of pyridine and allowing the mixture to react at 80° C for two hours.

The segment polymer is prepared from the pre-polymer and 10.0 g cellobiose exactly as described in Example 1. The same solvent quantities are also used. The yield of purified product is 56%.

The limiting viscosity /n/ of the segment polymer in dimethylformamide at 25° C is 0.20 dl g. From the dimethylformamide solution of the polymer comparatively brittle films are obtained.

EXAMPLE 5

In the preparation of the pre-polymer 5.8 g polyethylene glycol with molecular weight $M_n = 200$ and 14.7 g MDI are used (mol proportion 1:2). The starting substances are dissolved in 25 ml of pyridine and the mixture allowed to react at 80° C for 2 hours.

The segment polymer is prepared from the prepolymer and 10.0 g cellobiose exactly as described in Example 1. The same solvent quantities are also used. The yield of purified product is 51%.

The limiting viscosity /n/ of the product in dimethylformamide at 25° C is 0.22 dl g. Fairly brittle films are obtained from the dimethylformamide solution of the polymer.

EXAMPLE 6

The pre-polymer is prepared by dissolving 18.0 g polyethylene glycol adipinate, with molecular weight $M_n = 570$, and 16.0 g MDI (mol proportion 1:2) in 25 ml of pyridine and allowing the mixture to react at 80° C for 2 hours.

The segment polymer is prepared from the prepolymer and xylitol. The reaction is carried out as in Example 1, except that instead of cellobiose 4.8 g of xylitol are used. The same solvent quantities are also used. The yield of purified product is 48%.

The limiting viscosity /n/ of the product in dimethylformamide at 25° C is 0.23 dl g. The dimethylformamide solution of the polymer is processed into film with thickness of 0.11 mm, tensile strength 49 kg/cm² and elongation 260%. The polymer solution could also be precipitated in the form of brittle fiber.

EXAMPLE 7

The pre-polymer is obtained by dissolving 10.5 g polydiethylene glycol adipinate, molecular weight $M_n = 360$, and 14.6 g MDI (mol proportion 1:2) in 25 ml of pyridine and allowing the mixture to react at 80° C for 2 hours.

The segment polymer is prepared from the prepolymer and sorbitol. The reaction is carried out as described in Example 1, only using 5.3 g sorbitol instead of cellobiose. The same solvent quantities are also used. The yield of purified product is 66%.

The limiting viscosity /n/ of the product in dimethylformamide at 25° C is 0.25 dl g. Fairly brittle films are obtained from the dimethylformamide solution of the polymer.

EXAMPLE 8

The pre-polymer is prepared by dissolving 25.3 g polyethylene glycol adipinate, molecular weight $M_n = 360$, and 35 g MDI (mol proportion 1:2) in 20 ml of pyridine and allowing the mixture to react at 80° C for 2 hours.

The segment polymer is prepared from the prepolymer and 240 g cellobiose exactly as described in Example 1. The quantity of N-ethylpyridinium chloride is 120 g and that of dimethylformamide is 60 ml. The catalyst is 0.8% 1,4-diazabicyclo-2,2,2-octane dissolved in 4 ml of pyridine. The yield of purified product is 58%.

The limiting viscosity /n/ of the product in dimethylformamide at 25° C is 0.48 dl/g. The dimethylformamide solution of the polymer is processed into film with a tensile strength of 141 kg/cm² and elongation of 150% with 0.07 mm film thickness.

While the invention has been illustrated in particular with respect to specific reactants and reaction conditions, it is apparent that variations and modifications can be made.

What is claimed is:

1. A segmented copolymer containing free hydroxyl groups and comprising hard and soft segments, said hard segments comprising a polyhydroxy compound containing two primary hydroxyl groups and at least two secondary hydroxyl groups and being selected from the group consisting of disaccharides and sugar alcohols of the formula $$HOCH_2(CHOH)_nCH_2OH$$

wherein n is a whole number from 2 to 5, and said soft segments comprising a compound of average molecular weight of from about 250 to about 5000 and being selected from the group consisting of low molecular weight polyesters having terminal isocyanate groups and low molecular weight polyethers having terminal isocyanate groups, and hard segments being linked at the primary hydroxy groups thereof to the isocyanate groups of said soft segments so that said segmented copolymer is substantially free of cross linking and contains free secondary hydroxyl groups.

2. Segmented copolymer according to claim 1 wherein said polyhydroxy compound is a disaccharide.

3. Segmented copolymer according to claim 2 wherein said disaccharide is selected from the group consisting of cellobiose, lactose and maltose.

4. Segmented copolymer according to claim 1 wherein said polyhydroxy compound is a sugar alcohol.

5. Segmented copolymer according to claim 4 wherein said sugar alcohol is selected from the group consisting of xylitol, sorbitol and mannitol.

6. Method of producing a segmented copolymer of claim 1, which comprises reacting said compound selected from the group consisting of low molecular weight polyesters having terminal isocyanate groups and low molecular weight polyethers having terminal isocyanate groups with a solution of said polyhydroxy compound dissolved in an N-ethylpyridinium chloride melt, whereby said polyhydroxy compound is linked substantially only at the primary hydroxyl groups thereof to the isocyanate groups of said compound selected from the group consisting of low molecular weight polyesters and polyethers, thus forming the segmented copolymer of claim 1.

7. Method according to claim 6 wherein said N-ethylpyridinium chloride melt contains a melting point-lowering agent.

8. Method according to claim 7 wherein said melting point lowering agent is selected from the group consisting of pyridine, dimethylsulfoxide and sulfolan.

9. Method according to claim 6 wherein the reaction mixture includes a cross linking-preventing catalyst in an amount sufficient to prevent substantial cross linking.

10. Method according to claim 9 wherein said cross linking preventing catalyst is selected from the group consisting of triethylamine and 1,4-diazabicyclo-2,2,2-octane.

11. Method according to claim 10 wherein the amount of said catalyst is up to about 0.5% by weight.

12. Method according to claim 6 wherein said compound selected from the group consisting of low molecular weight polyesters having terminal isocyanate groups and low molecular weight polyethers having terminal isocyanate groups is formed by reacting the corresponding low molecular weight polyester or low molecular weight polyether with an organic diisocyanate in a medium of pyridine to form the corresponding compound having terminal isocyanate groups and adding the thus formed corresponding compound in said pyridine to said N-ethylpyridinium chloride melt.

13. Segmented copolymer according to claim 1 and in which the average molecular weight thereof is between about 10000 and 25000.

* * * * *